US012537546B2

(12) United States Patent
Kovacic et al.

(10) Patent No.: US 12,537,546 B2
(45) Date of Patent: Jan. 27, 2026

(54) CROSSBAR SWITCH FOR COARSE PHASE SHIFTING

(71) Applicant: Skyworks Global Pte. Ltd., Singapore (SG)

(72) Inventors: Stephen Joseph Kovacic, Newport Beach, CA (US); David Richard Pehlke, Westlake Village, CA (US); Grant Darcy Poulin, Carp (CA); Joshua James Caron, Summerfield, NC (US); Bo Pan, Irvine, CA (US); Kwang Jae Shin, Yongin (KR)

(73) Assignee: Skyworks Global Pte. Ltd., Singapore (SG)

( * ) Notice: Subject to any disclaimer, the term of this patent is extended or adjusted under 35 U.S.C. 154(b) by 398 days.

(21) Appl. No.: 18/146,601

(22) Filed: Dec. 27, 2022

(65) Prior Publication Data

US 2023/0208451 A1    Jun. 29, 2023

Related U.S. Application Data

(60) Provisional application No. 63/266,096, filed on Dec. 28, 2021.

(51) Int. Cl.
*H04B 1/00* (2006.01)
*H04B 1/40* (2015.01)

(52) U.S. Cl.
CPC ............. *H04B 1/0064* (2013.01); *H04B 1/40* (2013.01)

(58) Field of Classification Search
CPC ................................ H04B 1/0064; H04B 1/40
See application file for complete search history.

(56) References Cited

U.S. PATENT DOCUMENTS 3,816,830 A * 6/1974 Giannini ............... D06M 15/31
342/359
5,548,813 A   8/1996 Charas et al.
(Continued)

FOREIGN PATENT DOCUMENTS

| CN | 107069208 | 8/2017 |
|---|---|---|
| CN | 206774674 U | 12/2017 |
| JP | 2011-233962 | 11/2011 |

OTHER PUBLICATIONS

Kim et al., "Tens of Gbps Support with mmWave Beamforming Systems for Next Generation Communications" IEEE, Globecom 2013—Wireless Communications Symposium, 6 pages.
(Continued)

*Primary Examiner* — Nguyen T Vo
(74) *Attorney, Agent, or Firm* — Knobbe, Martens, Olson & Bear, LLP

(57) ABSTRACT

Crossbar switches for coarse phase shifting are disclosed. In certain embodiments, a mobile device includes an antenna array including a plurality of antennas. The mobile device further includes a front end system coupled to the antenna array and including a plurality of signal conditioning circuits each including a phase shifter. The plurality of signal conditioning circuits each provide phase shifting to a respective one of a plurality of radio frequency signals based on a fine control signal. The front end system further includes a crossbar switch coupled to the plurality of signal conditioning circuits and configured to provide phase shifting to the plurality of radio frequency signals based on a coarse control signal.

20 Claims, 15 Drawing Sheets

(56) References Cited

U.S. PATENT DOCUMENTS

| | | | |
|---|---|---|---|
| 5,874,915 A * | 2/1999 | Lee | H01Q 21/205 |
| | | | 342/372 |
| 6,181,276 B1 * | 1/2001 | Schlekewey | H04W 16/28 |
| | | | 342/372 |
| 8,942,653 B2 | 1/2015 | Ahn et al. | |
| 9,485,552 B1 | 11/2016 | Dupuis et al. | |
| 9,794,091 B1 | 10/2017 | Yucek et al. | |
| 10,727,923 B2 | 7/2020 | Thyagarajan et al. | |
| 11,973,550 B2 | 4/2024 | Kovacic | |
| 12,166,548 B2 | 12/2024 | Kovacic | |
| 2002/0136170 A1 | 9/2002 | Struhsaker | |
| 2003/0228857 A1 | 12/2003 | Maeki | |
| 2004/0198452 A1 | 10/2004 | Roy | |
| 2007/0071118 A1 | 3/2007 | Sydir et al. | |
| 2007/0263748 A1 | 11/2007 | Mesecher | |
| 2008/0268775 A1 | 10/2008 | Bishop | |
| 2008/0268790 A1 | 10/2008 | Shi et al. | |
| 2013/0241800 A1 | 9/2013 | Schlub et al. | |
| 2015/0365877 A1 * | 12/2015 | Leather | H04L 49/101 |
| | | | 370/328 |
| 2017/0302348 A1 | 10/2017 | Reinhardt | |
| 2017/0331670 A1 | 11/2017 | Parkvall et al. | |
| 2018/0180713 A1 * | 6/2018 | Cohen | G01S 13/32 |
| 2018/0198204 A1 | 7/2018 | Kovacic | |
| 2019/0377075 A1 * | 12/2019 | Tsfati | H04B 17/27 |
| 2020/0091608 A1 | 3/2020 | Alpman et al. | |
| 2020/0119454 A1 | 4/2020 | Asrani | |
| 2021/0273345 A1 | 9/2021 | Moon et al. | |
| 2022/0182105 A1 | 6/2022 | Ota et al. | |
| 2022/0209834 A1 | 6/2022 | Kovacic | |
| 2022/0209836 A1 | 6/2022 | Kovacic | |
| 2022/0352878 A1 * | 11/2022 | Zhang | H04L 27/362 |
| 2022/0360303 A1 | 11/2022 | Rainish | |
| 2023/0129420 A1 * | 4/2023 | Yun | H02J 50/20 |
| | | | 307/104 |
| 2025/0038424 A1 * | 1/2025 | Szczepanik | H01Q 19/062 |
| 2025/0150127 A1 | 5/2025 | Kovacic | |

OTHER PUBLICATIONS

Kim et al., "Multi-beam transmission diversity with hybrid beamforming for MIMO-OFDM systems", Globecom 2013 Workshop—Emerging Technologies for LTE-Advanced and Beyond-4G, pp. 61-65.

Karjalainen, Juha, "On Multi-Antenna Transceivers for mm-wave 5G," Samsung Electronics, 5G New Air Interfaces, IEEE Globecom Industry Workshop 2014, Austin, USA, 10 pages.

Karjalainen et al., "Challenges and opportunities of mm-wave communications in 5G networks", Crowncom, Jun. 2-4, 2014, Oulu, Finland, in 5 pages.

Peng et al. "High performance 5G millimeter-wave antenna array for 37-40 GHz mobile application" Conference Paper Mar. 2018, Research Gate IEEE in 5 pages.

Rajagopal et al., "Power Efficient Signal Processing for mmWave 5G Systems" J Sign Process Syst 2016, Published online: Nov. 18, 2015, 14 pages.

* cited by examiner

CROSSBAR SWITCH FOR COARSE PHASE SHIFTING

CROSS-REFERENCE TO RELATED APPLICATIONS

This application claims the benefit of priority under 35 U.S.C. § 119 of U.S. Provisional Patent Application No. 63/266,096, filed Dec. 28, 2021 and titled "CROSSBAR SWITCH FOR COARSE PHASE SHIFTING," which is herein incorporated by reference in its entirety.

BACKGROUND

Field

Embodiments of the invention relate to electronic systems, and in particular, to radio frequency (RF) electronics.

Description of the Related Technology

Radio frequency (RF) communication systems wirelessly communicate RF signals using antennas.

Examples of RF communication systems that utilize antennas for communication include, but are not limited to mobile phones, tablets, base stations, network access points, laptops, and wearable electronics. RF signals have a frequency in the range from about 30 kHz to 300 GHz, for instance, in the range of about 400 MHz to about 7.125 GHz for Frequency Range 1 (FR1) of the Fifth Generation (5G) communication standard or in the range of about 24.250 GHz to about 71.000 GHz for Frequency Range 2 (FR2) of the 5G communication standard.

SUMMARY

In one aspect, a mobile device is provided. The mobile device includes an antenna array including a plurality of antennas, and a front end system coupled to the antenna array. The front end system includes a plurality of signal conditioning circuits each including a phase shifter, the plurality of signal conditioning circuits each configured to provide phase shifting to a respective one of a plurality of radio frequency signals based on a fine control signal. The front end system further includes a crossbar switch coupled to the plurality of signal conditioning circuits and configured to provide phase shifting to the plurality of radio frequency signals based on a coarse control signal.

In various embodiments, a number of the plurality of antennas and a number of the plurality of signal conditioning circuits are equal.

In several embodiments, a number of the plurality of antennas is greater than a number of the plurality of signal conditioning circuits.

In some embodiments, a number of the plurality of antennas is less than a number of the plurality of signal conditioning circuits.

In various embodiments, the crossbar switch is implemented with a buffer function and a switch function.

In several embodiments, the plurality of radio frequency signals are received on the antenna array.

In some embodiments, the plurality of radio frequency signals are transmitted on the antenna array.

In various embodiments, the mobile device further includes a transceiver coupled to the front end system and configured to process the plurality of radio frequency signals. According to a number of embodiments, the transceiver generates the coarse control signal and the fine control signal.

In certain embodiments, a front end system for a mobile device is disclosed. The front end system includes a plurality of signal conditioning circuits each including a phase shifter, the plurality of signal conditioning circuits each configured to provide phase shifting to a respective one of a plurality of radio frequency signals based on a fine control signal. The front end system further includes a crossbar switch coupled to the plurality of signal conditioning circuits and configured to provide phase shifting to the plurality of radio frequency signals based on a coarse control signal.

In various embodiments, a number of inputs to the crossbar switch and a number of outputs to the crossbar switch are equal.

In several embodiments, a number of inputs to the crossbar is greater than a number of outputs to the crossbar switch.

In some embodiments, a number of inputs to the crossbar is less than a number of outputs to the crossbar switch.

In several embodiments, the crossbar switch is implemented with a buffer function and a switch function.

In various embodiments, the plurality of radio frequency circuits are connected between the crossbar switch and an antenna array.

In some embodiments, the crossbar switch is connected between the plurality of radio frequency circuits and an antenna array.

In certain embodiments, the present disclosure relates to a method of phase shifting in a mobile device is provided. The method includes phase shifting a plurality of radio frequency signals based on a fine control signal using a plurality of signal conditioning circuits, each of the plurality of radio frequency signals providing phase shifting to a respective one of the plurality of plurality of signal conditioning circuits. The method further includes phase shifting the plurality of radio frequency signals using a crossbar switch based on a coarse control signal, the crossbar switch coupled to the plurality of signal conditioning circuits. The method further includes wirelessly communicating the plurality of radio frequency signals using a plurality of antennas of an antenna array.

In various embodiments, phase shifting the plurality of radio frequency signals using the crossbar switch includes buffering the plurality of radio frequency signals, and switching the plurality of radio frequency signals.

In several embodiments, wirelessly communicating the plurality of radio frequency signals includes receiving the plurality of radio frequency signals on the antenna array.

In some embodiments, wirelessly communicating the plurality of radio frequency signals includes transmitting the plurality of radio frequency signals on the antenna array.

DETAILED DESCRIPTION OF EMBODIMENTS

Figure 1:
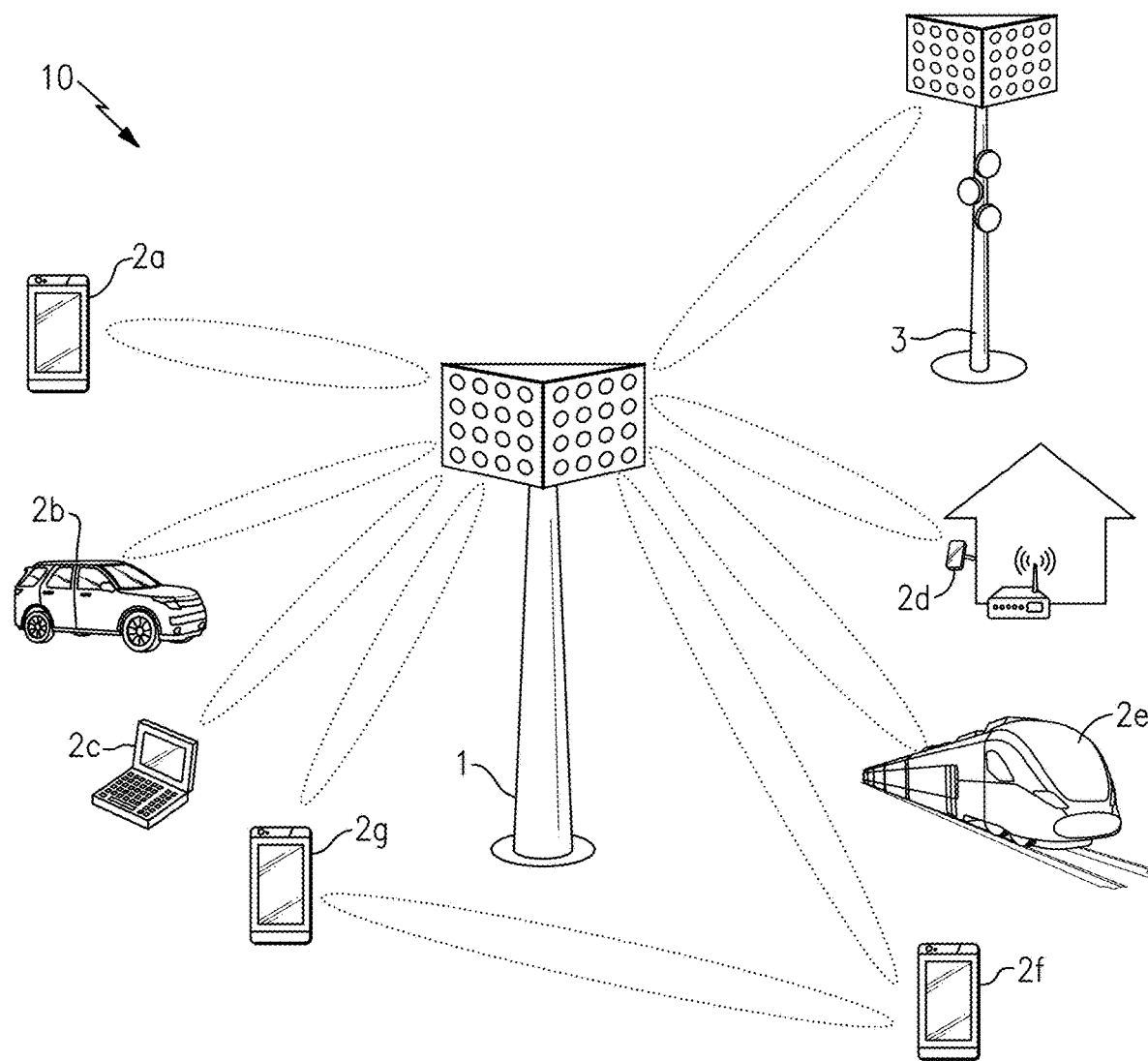
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and introduced Phase 2 of 5G technology in Release 16. Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul (for instance, as between mobile device 2g and mobile device 2f).

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands which include 5G FR2. Thus, as used herein a millimeter wave signal can include traditional millimeter waves (30 GHz to 300 GHz) as well as upper centimeter wave frequencies in the range of 24 GHz to 30 GHz. Cellular user equipment can communicate using beamforming and/or other techniques over a wide range of frequencies, including, for example, FR2-1 (24 GHz to 52 GHz), FR2-2 (52 GHz to 71 GHz), and/or FR1 (400 MHz to 7125 MHz).

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
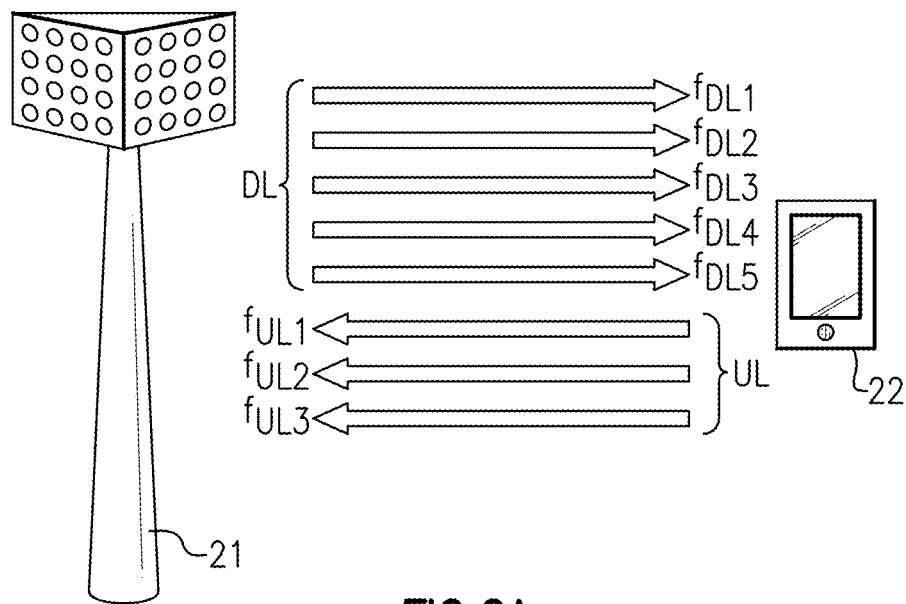
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
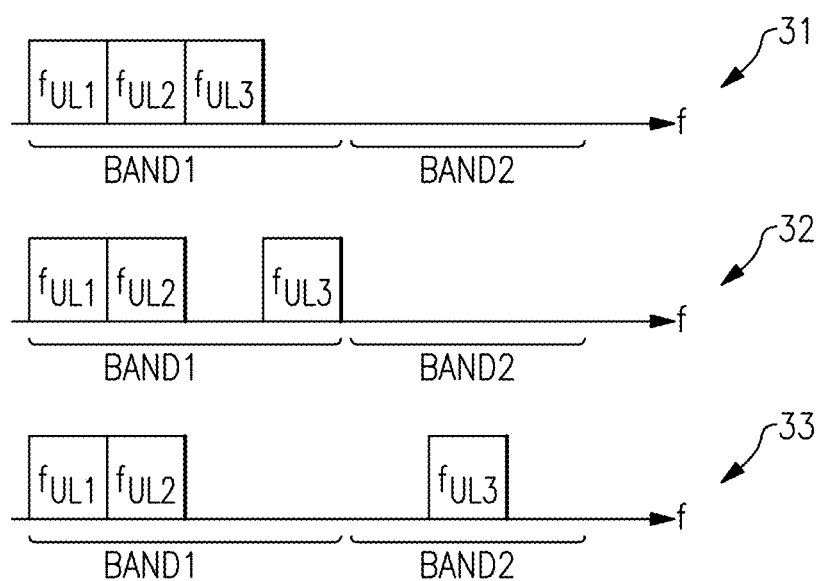
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
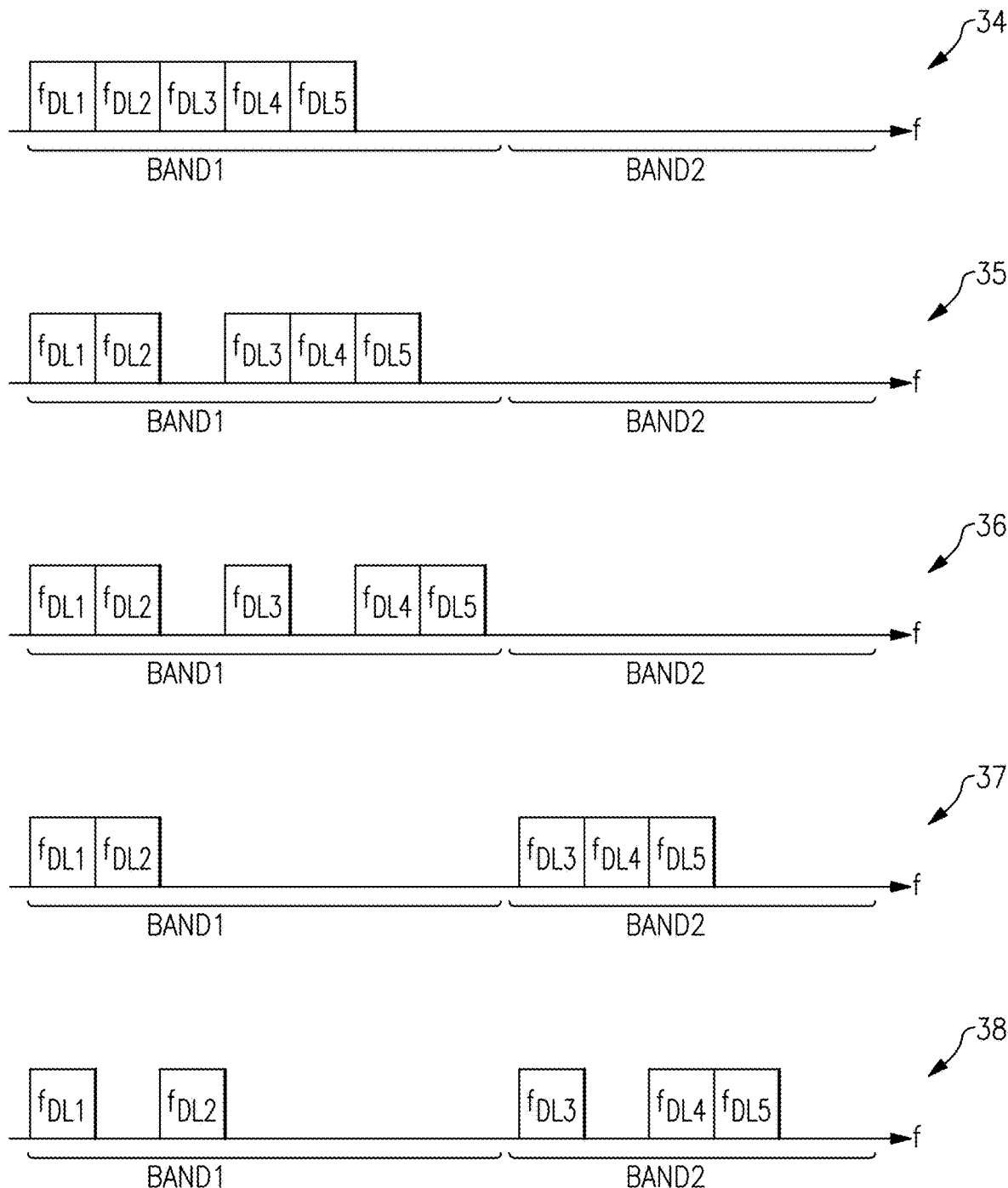
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and secondary cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink. Furthermore, NR-U can operate on top of LAA/eLAA over a 5 GHz band (5150 to 5925 MHz) and/or a 6 GHz band (5925 MHz to 7125 MHz).

Figure 3A:
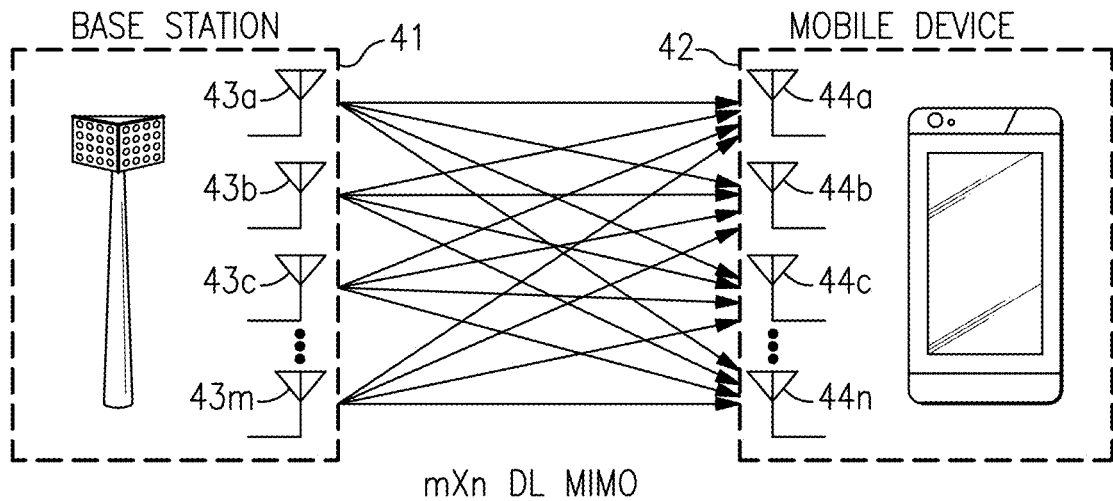
FIG. 3A is a schematic diagram of one example of a downlink channel using multi-input and multi-output (MIMO) communications.
Figure 3B:
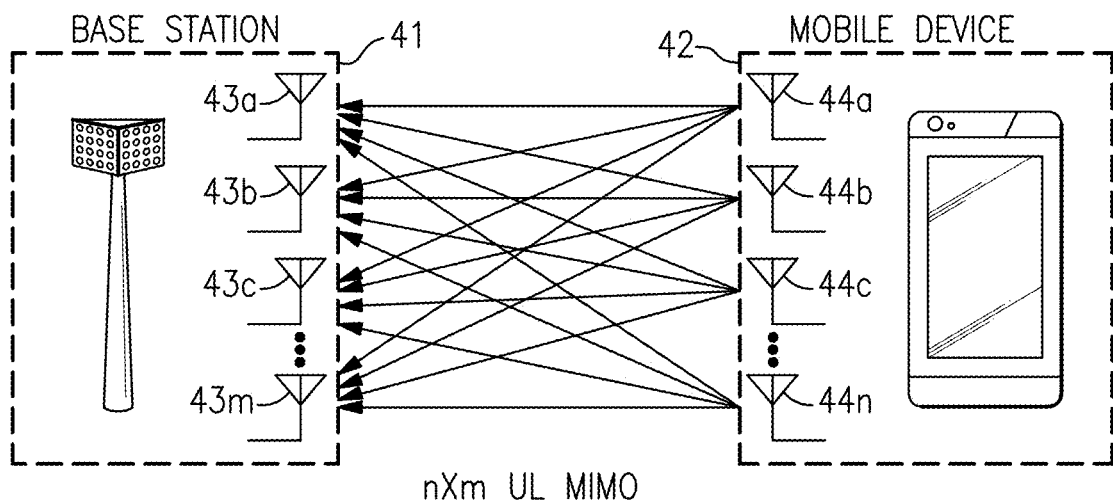
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas $43a$, $43b$, $43c$, ... $43m$ of the base station 41 and receiving using N antennas $44a$, $44b$, $44c$, ... $44n$ of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas $44a$, $44b$, $44c$, ... $44n$ of the mobile device 42 and receiving using M antennas $43a$, $43b$, $43c$, ... $43m$ of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
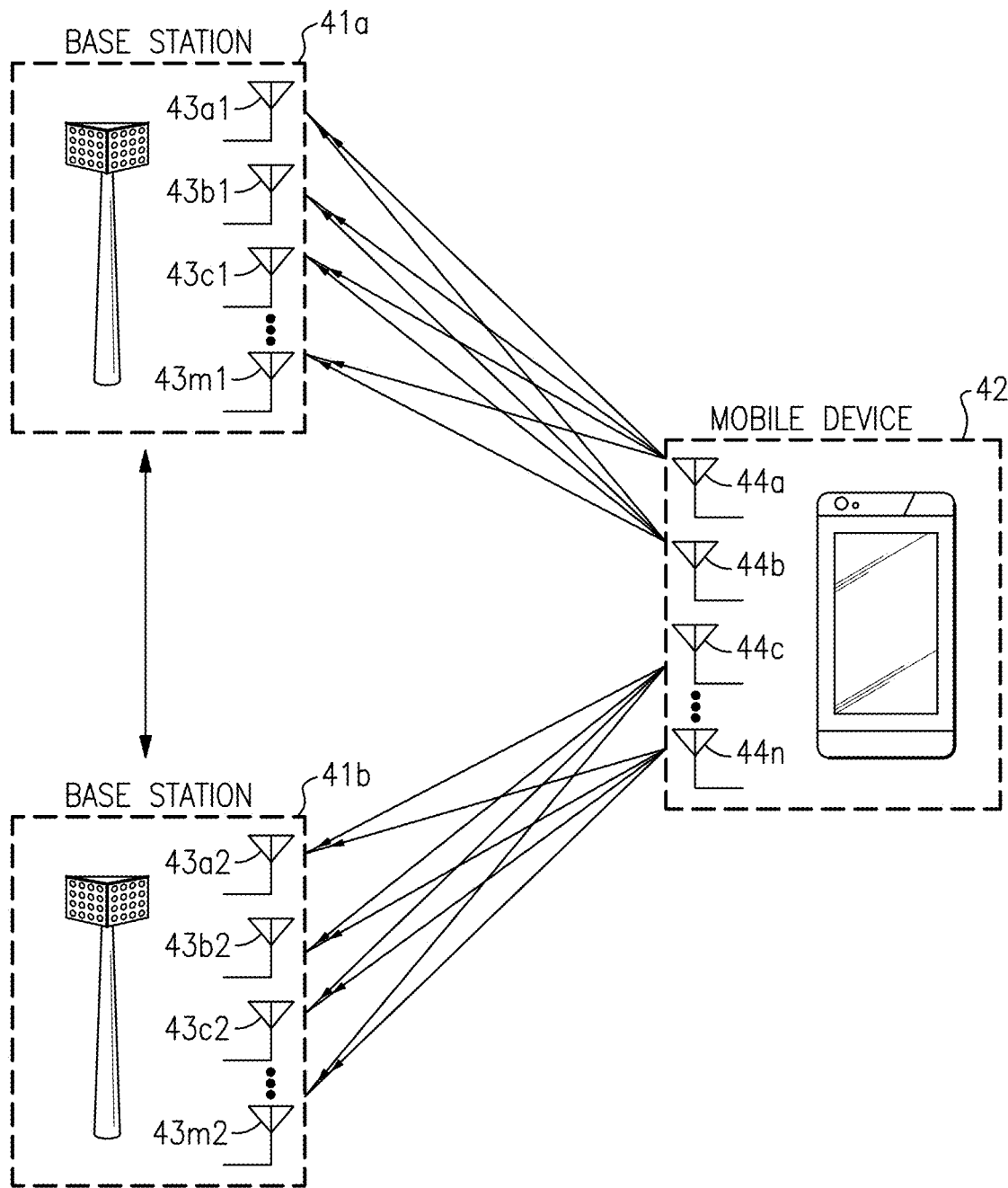
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas $44a$, $44b$, $44c$, ... $44n$ of the mobile device 42. Additional a first portion of the uplink transmissions are received using M antennas $43a1$, $43b1$, $43c1$, ... $43m1$ of a first base station $41a$, while a second portion of the uplink transmissions are received using M antennas $43a2$, $43b2$, $43c2$, ... $43m2$ of a second base station $41b$. Additionally, the first base station $41a$ and the second base station $41b$ communication with one another over wired, optical, and/or wireless links.

The MIMO scenario of FIG. 3C illustrates an example in which multiple base stations cooperate to facilitate MIMO communications.

Figure 4A:
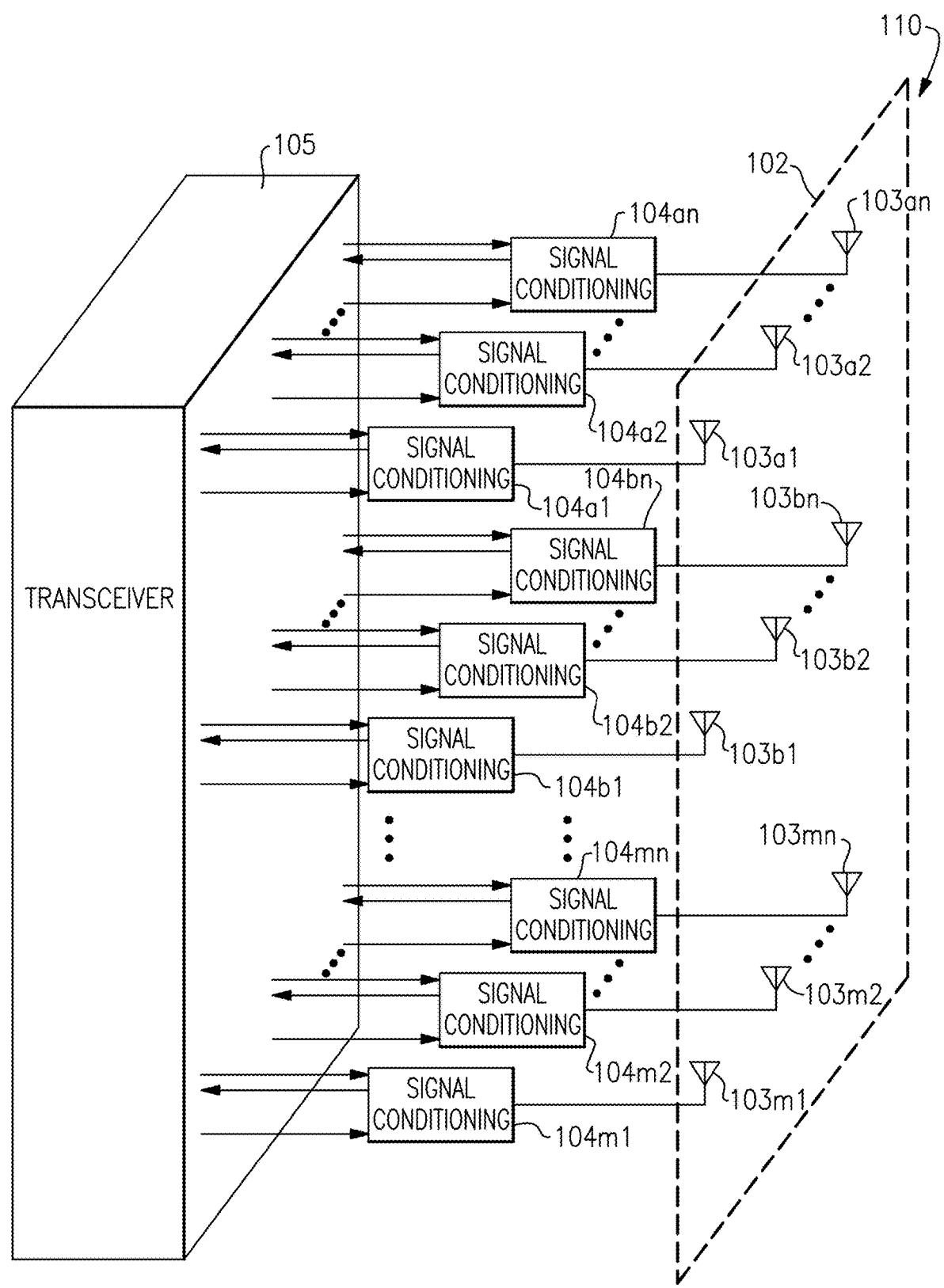
FIG. 4A is a schematic diagram of one example of a communication system that operates with beamforming.

FIG. 4A is a schematic diagram of one example of a communication system 110 that operates with beamforming. The communication system 110 includes a transceiver 105, signal conditioning circuits $104a1$, $104a2$ ... $104an$, $104b1$, $104b2$ ... $104bn$, $104m1$, $104m2$ ... $104mn$, and an antenna array 102 that includes antenna elements $103a1$, $103a2$ ... $103an$, $103b1$, $103b2$ ... $103bn$, $103m1$, $103m2$ ... $103mn$.

Communications systems that communicate using millimeter wave carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 4A, the transceiver 105 generates control signals for the signal conditioning circuits. The control signals can be used for a variety of functions, such as controlling the gain and phase of transmitted and/or received signals to control beamforming.

Figure 4B:
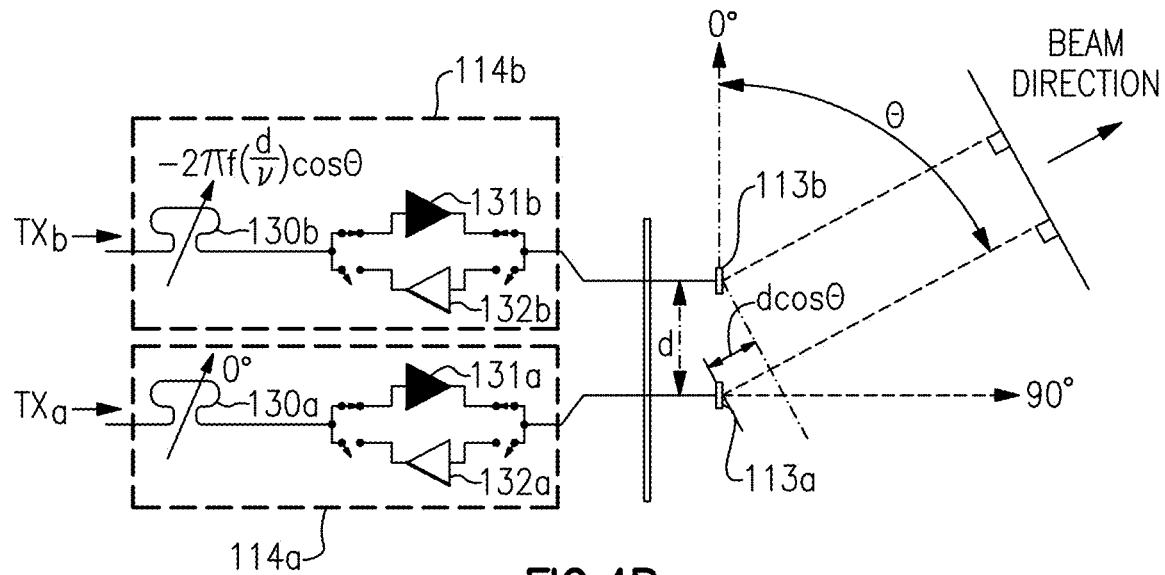
FIG. 4B is a schematic diagram of one example of beamforming to provide a transmit beam.

FIG. 4B is a schematic diagram of one example of beamforming to provide a transmit beam. FIG. 4B illustrates a portion of a communication system including a first signal conditioning circuit $114a$, a second signal conditioning circuit $114b$, a first antenna element $113a$, and a second antenna element $113b$.

Although illustrated as included two antenna elements and two signal conditioning circuits, a communication system can include additional antenna elements and/or signal conditioning circuits. For example, FIG. 4B illustrates one embodiment of a portion of the communication system 110 of FIG. 4A.

The first signal conditioning circuit $114a$ includes a first phase shifter $130a$, a first power amplifier $131a$, a first low noise amplifier (LNA) $132a$, and switches for controlling selection of the power amplifier $131a$ or LNA $132a$. Additionally, the second signal conditioning circuit $114b$ includes a second phase shifter $130b$, a second power amplifier $131b$, a second LNA $132b$, and switches for controlling selection of the power amplifier $131b$ or LNA $132b$.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113a and the second antenna element 113b are separated by a distance d. Additionally, FIG. 4B has been annotated with an angle Θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113a, 113b, a desired transmit beam angle Θ can be achieved. For example, when the first phase shifter 130a has a reference value of 0°, the second phase shifter 130b can be controlled to provide a phase shift of about $-2\pi(d/v)\cos\Theta$ radians, where f is the fundamental frequency of the transmit signal, d is the distance between the antenna elements, v is the velocity of the radiated wave, and π is the mathematic constant pi.

In certain implementations, the distance d is implemented to be about ½ λ, where λ is the wavelength of the fundamental component of the transmit signal. In such implementations, the second phase shifter 130b can be controlled to provide a phase shift of about $-\pi\cos\Theta$ radians to achieve a transmit beam angle Θ.

Accordingly, the relative phase of the phase shifters 130a, 130b can be controlled to provide transmit beamforming. In certain implementations, a baseband processor and/or a transceiver (for example, the transceiver 105 of FIG. 4A) controls phase values of one or more phase shifters and gain values of one or more controllable amplifiers to control beamforming.

Figure 4C:
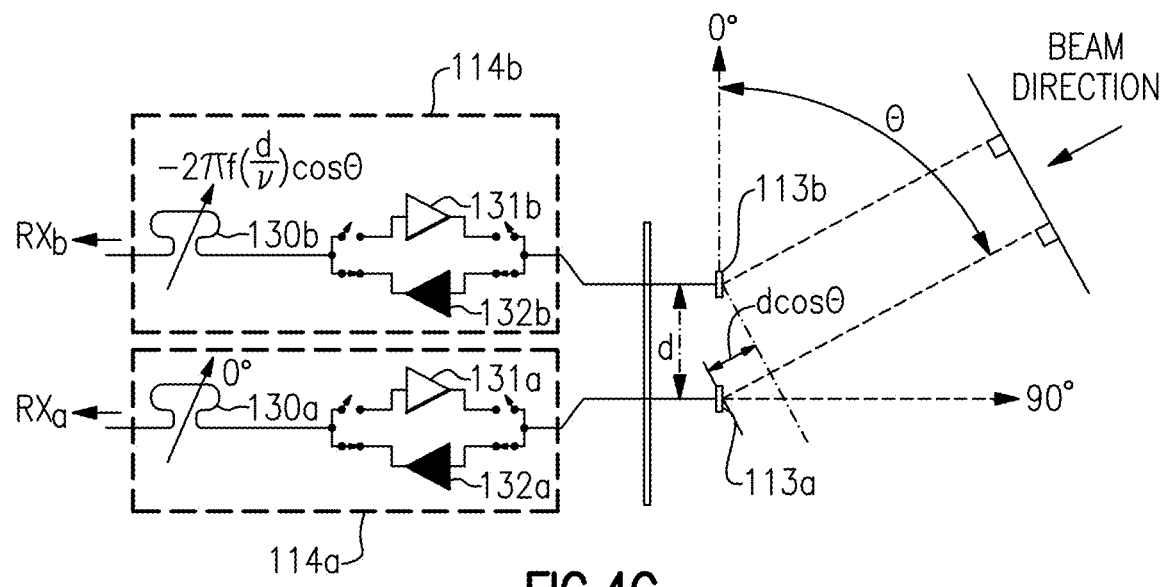
FIG. 4C is a schematic diagram of one example of beamforming to provide a receive beam.

FIG. 4C is a schematic diagram of one example of beamforming to provide a receive beam. FIG. 4C is similar to FIG. 4B, except that FIG. 4C illustrates beamforming in the context of a receive beam rather than a transmit beam.

As shown in FIG. 4C, a relative phase difference between the first phase shifter 130a and the second phase shifter 130b can be selected to about equal to $-2\pi f(d/v)\cos\Theta$ radians to achieve a desired receive beam angle Θ. In implementations in which the distance d corresponds to about ½ λ, the phase difference can be selected to about equal to $-\pi\cos\Theta$ radians to achieve a receive beam angle Θ.

Although various equations for phase values to provide beamforming have been provided, other phase selection values are possible, such as phase values selected based on implementation of an antenna array, implementation of signal conditioning circuits, and/or a radio environment.

Figure 5A:
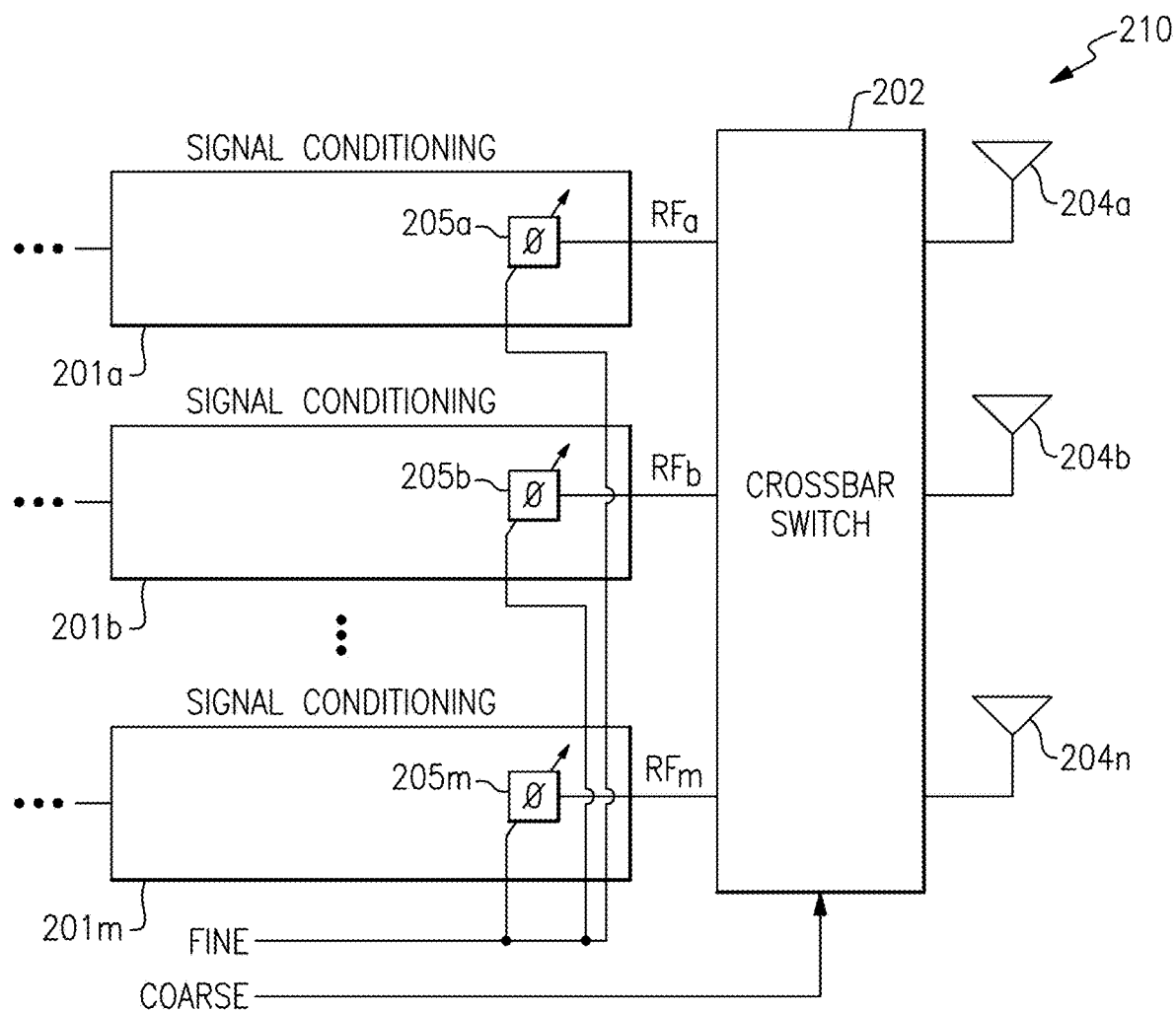
FIG. 5A is a schematic diagram of another embodiment of a communication system that operates with beamforming.

FIG. 5A is a schematic diagram of another embodiment of a communication system 210 that operates with beamforming.

The communication system 210 includes signal conditioning circuits 201a, 201b, . . . 201m, a crossbar switch 202, and an antenna array including antennas 204a, 204b, . . . 204n. In the illustrated embodiment, m signal conditioning circuits and n antennas are included, where m and n are any suitable integers of 2 or more (or more particularly 4 or more). In a first example, m is equal to n. In a second example, n is greater than m. In a third example, m is greater than n.

The antenna array can include the antennas 204a, 204b, . . . 204n arranged in any suitable pattern or configuration desired for beamforming. In one example, the antennas 204a, 204b, . . . 204n are arranged in a rectangular arrangement or grid.

As shown in FIG. 5A, the signal conditioning circuit 201a, 201b, . . . 201m include the phase shifters 205a, 205b, . . . 205m, respectively, for phase shifting RF signals $RF_a$, $RF_b$, . . . $RF_m$, respectively, based on a fine control signal FINE. The phase shifters 205a, 205b, . . . 205m can be used to provide phase shifting in any suitable way.

In a first example, the phase shifters 205a, 205b, . . . 205m are used for phase shifting RF transmit signals transmitted on the antenna array.

In a second example, the phase shifters 205a, 205b, . . . 205m are used for phase shifting RF receive signals received from the antenna array.

In a third example, the phase shifters 205a, 205b, . . . 205m are switch-controlled and used for phase shifting both for transmit and receive.

In a fourth example, separate phase shifters are included each for transmit and receive.

In the illustrated embodiment, the crossbar switch 202 can be used to connect any antenna to any signal conditioning circuit. Thus, the crossbar switch 202 includes m first terminals each connected to a respective one of the signal conditioning circuits 201a, 201b, . . . 201m, and n second terminals each connected to a respective one of the antennas 204a, 204b, . . . 204n.

The crossbar switch 202 is controlled by a coarse control signal COARSE to provide coarse phase shifting for beamforming. Additionally, the phase shifters 205a, 205b, . . . 205m are controlled by the fine control signal FINE to provide fine phase shifting for beamforming. The fine phase control is of finer resolution relative to the coarse phase control.

By using two levels or layers or phase shifting, enhanced precision for beamforming and/or reduced complexity of a phase shifting function can be achieved.

The fine control signal FINE and the coarse control signal COARSE can be generated in a wide variety of ways, including, using a transceiver (or RFIC), a baseband processor, and/or any other suitable circuit.

In certain implementations, a transceiver is connected to the signal conditioning circuits. With respect to transmission, such a transceiver can generate RF signals that are provided to the signal conditioning circuits. With respect to reception, the transceiver can process the RF signals from the signal conditioning circuits.

Figure 5B:
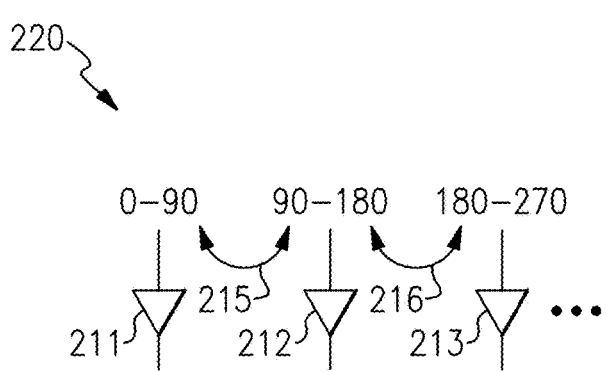
FIG. 5B is a schematic diagram of a crossbar switch for coarse beamforming according to one embodiment.

FIG. 5B is a schematic representation of a crossbar switch 220 for coarse beamforming. The cross switch 220 includes buffer functionality 211, 212, and 213 and switch functionality 215, 216 for coarse phase shifting (0-90 degree/90-180 degree/180-270 degree . . . , in this example).

In certain embodiments, the RF signals that are phase shifted are FR2 signals for 5G. Table 1 below depicts examples of FR2 frequency bands that can by phase-shifted in accordance with the teachings herein.

TABLE 1

| 5G Frequency Band | Band Duplex Type | UL/DL Low [MHz] | UL/DL High [MHz] |
|---|---|---|---|
| n257 | TDD | 26500 | 29500 |
| n258 | TDD | 24250 | 27500 |
| n259 | TDD | 39500 | 43500 |
| n260 | TDD | 37000 | 40000 |
| n261 | TDD | 27500 | 28350 |
| n262 | TDD | 47200 | 48200 |
| n263 | TDD | 57000 | 71000 |

Figure 5C:
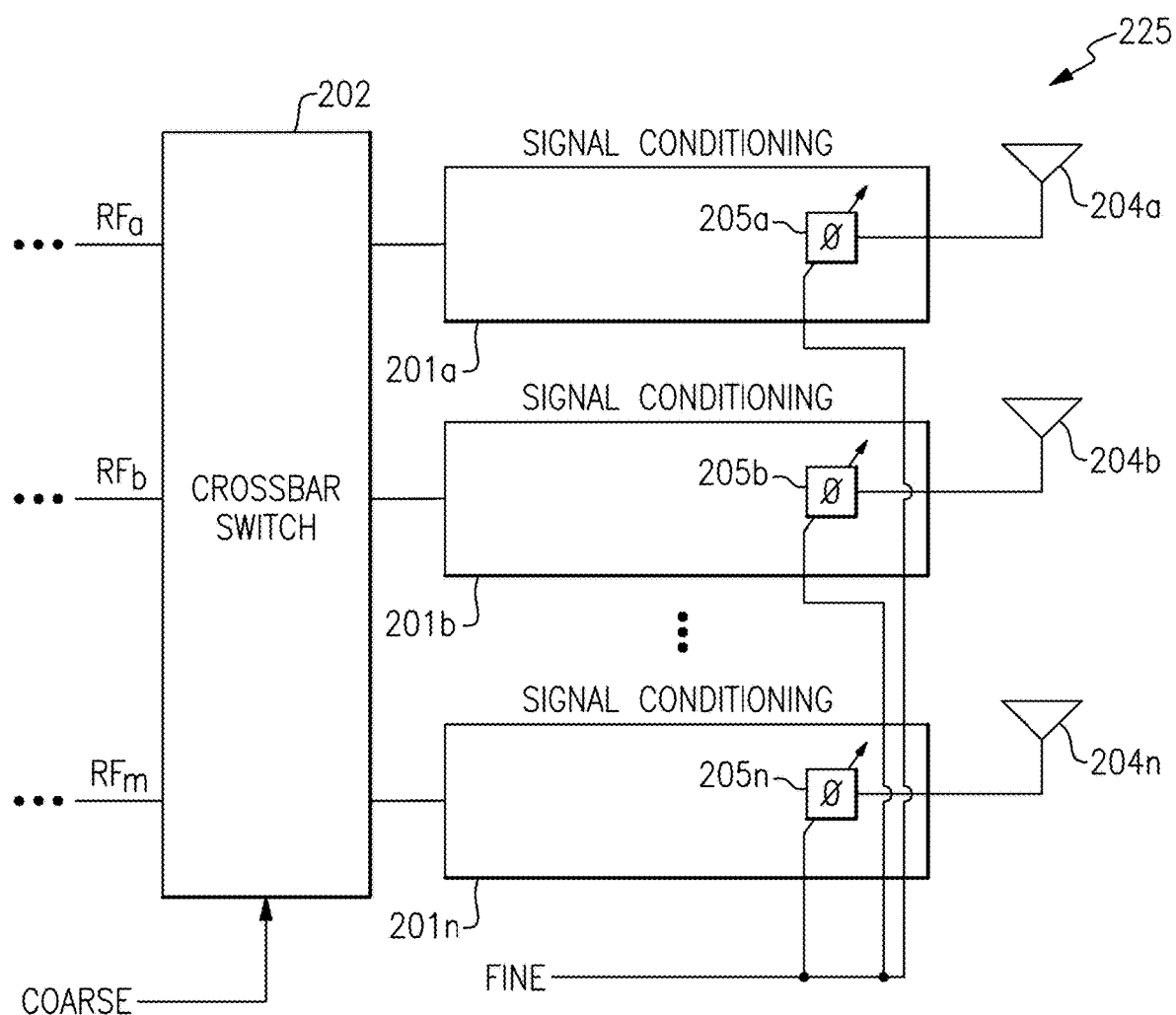
FIG. 5C is a schematic diagram of another embodiment of a communication system that operates with beamforming.

FIG. 5C is a schematic diagram of another embodiment of a communication system 225 that operates with beamforming. The communication system 225 includes signal conditioning circuits 201a, 201b, ... 201n, a crossbar switch 202, and an antenna array including antennas 204a, 204b, ... 204n. The signal conditioning circuits 201a, 201b, ... 201n include phase shifters 205a, 205b, ... 205n for providing fine phase shifting.

The communication system 225 of FIG. 5C is similar to the RF communication system 210 of FIG. 5A, except that the RF communication system 225 reverses the order of the signal conditioning circuits and the crossbar switch in the signal chain.

Figure 5D:
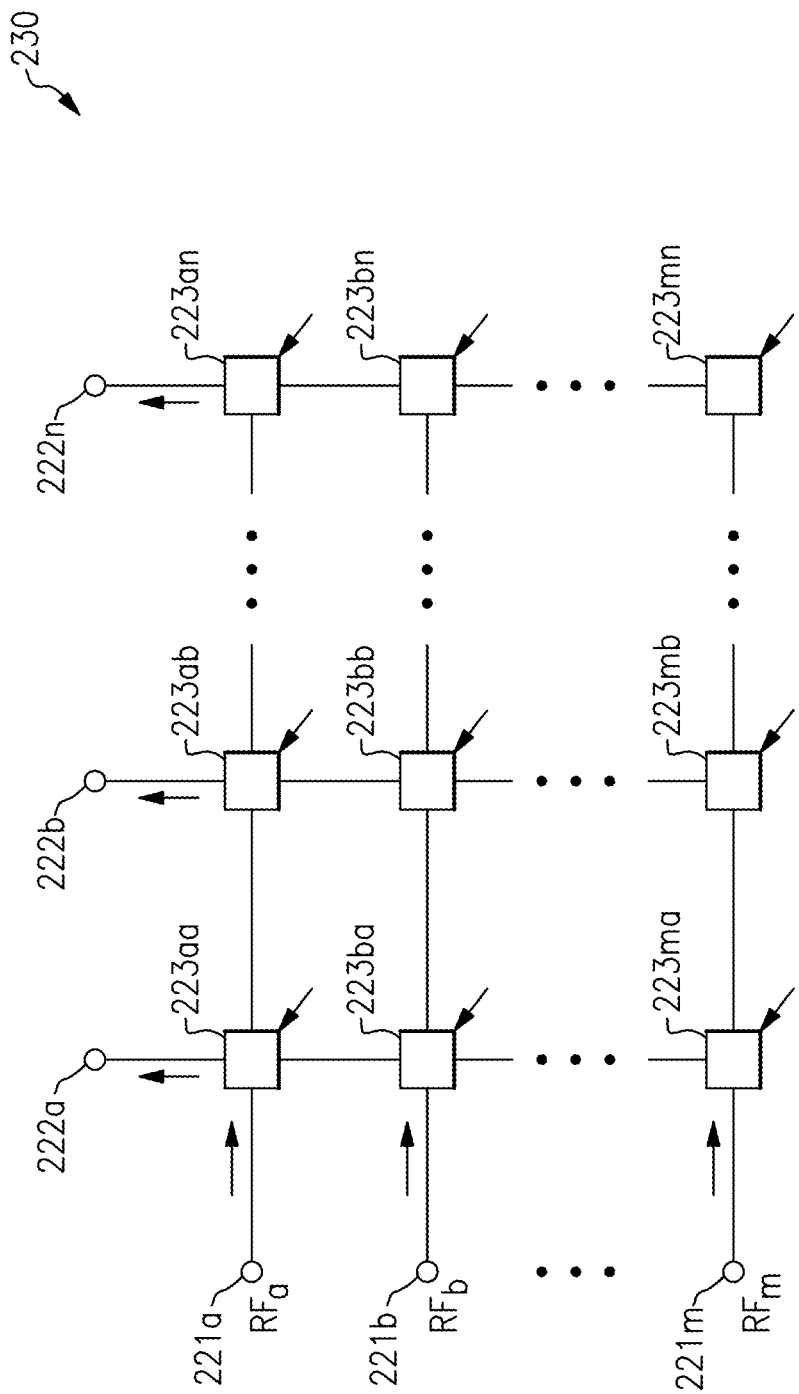
FIG. 5D is a schematic diagram of a crossbar switch for coarse beamforming according to another embodiment.

FIG. 5D is a schematic diagram of a crossbar switch 230 for coarse beamforming according to another embodiment. The crossbar switch 230 includes input terminals 221a, 221b, ... 221m, output terminals 222a, 222b, ... 222n, and switches 223aa, 223ab, ... 223an, 223ba, 223bb, ... 223bn, 223ma, 223mb, ... 223mn. The input terminals 221a, 221b, ... 221m receive RF signals $RF_a$, $RF_b$, ... $RF_m$ of different phases.

Although one embodiment of a crossbar switch is depicted, the teachings herein are applicable to crossbar switches implemented in a wide variety of ways. Accordingly, other implementations are possible.

The switches 223aa, 223ab, ... 223an, 223ba, 223bb, ... 223bn, 223ma, 223mb, ... 223mn can be used to connected one or more of the input terminals 221a, 221b, ... 222m to one or more of the output terminals 222a, 222b, ... 222n. Accordingly, the crossbar switch 230 allows for a flexible mapping between input terminals and output terminals, thereby providing coarse phase shifting with high flexibility. Any suitable number of inputs m and outputs n can be used, where m and n can be the same or different in value.

Figure 5E:
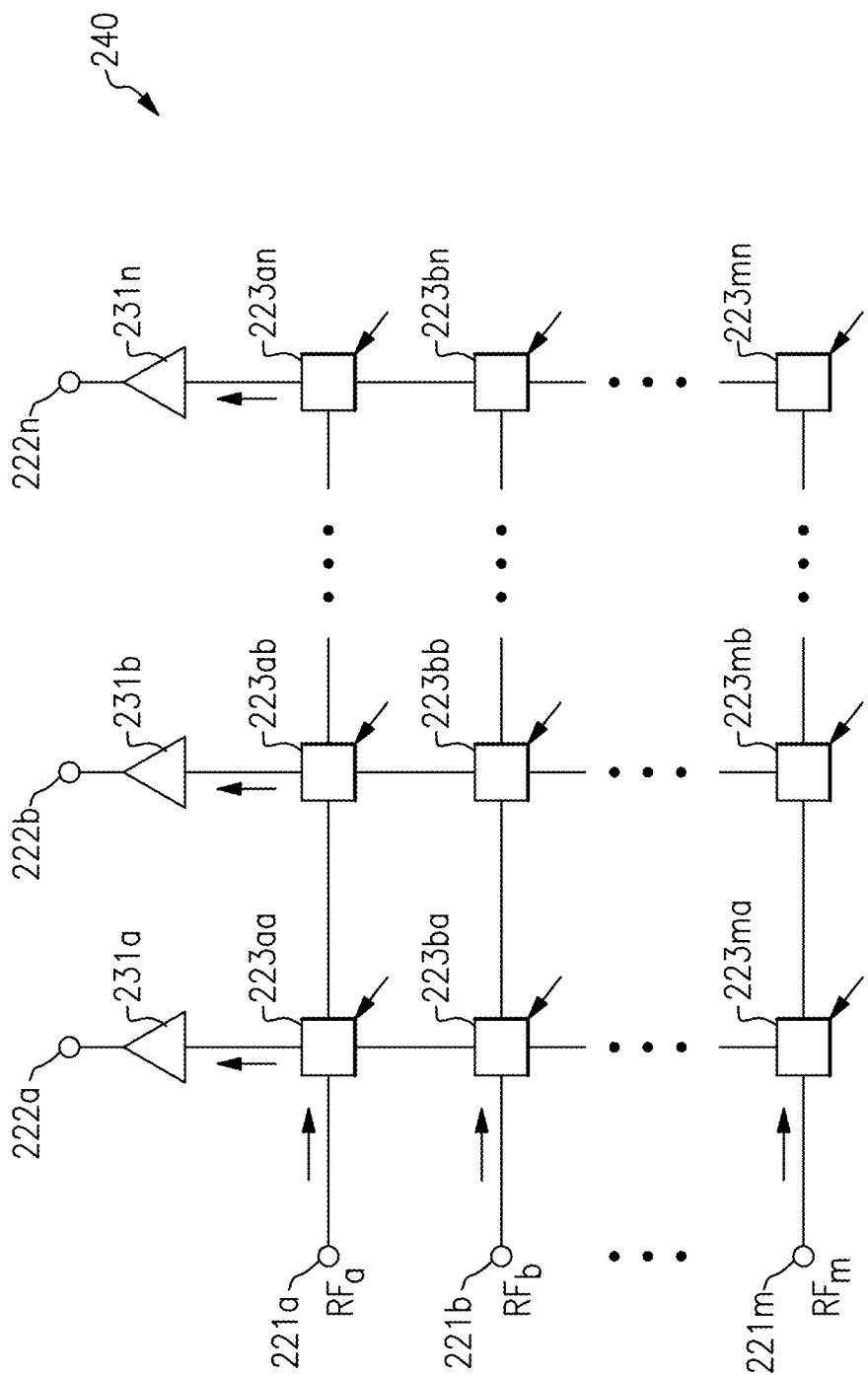
FIG. 5E is a schematic diagram of a crossbar switch for coarse beamforming according to another embodiment.

FIG. 5E is a schematic diagram of a crossbar switch 240 for coarse beamforming according to another embodiment. The crossbar switch 240 of FIG. 5E is similar to the crossbar switch 230 of FIG. 5D, except that the crossbar switch 240 of FIG. 5E further includes buffers 231a, 231b, ... 231n coupled to the output terminals 222a, 222b, ... 222n, respectively.

Figure 5F:
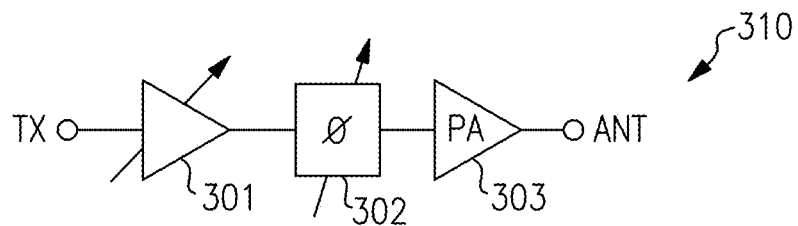
FIG. 5F is a schematic diagram of a signal conditioning circuit according to one embodiment.
Figure 5G:
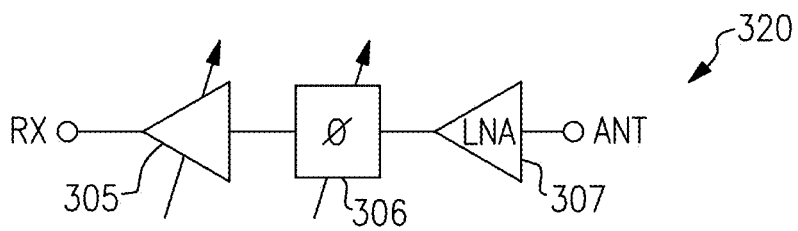
FIG. 5G is a schematic diagram of a signal conditioning circuit according to another embodiment.
Figure 5H:
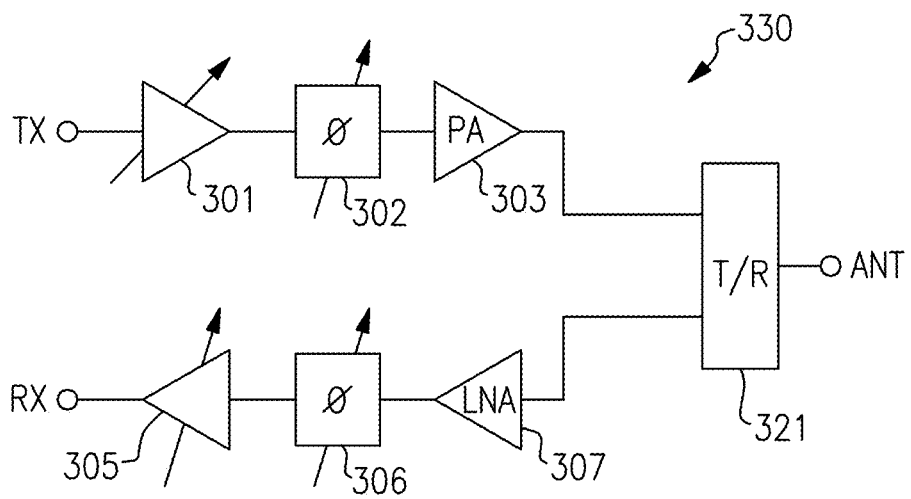
FIG. 5H is a schematic diagram of a signal conditioning circuit according to another embodiment.

FIGS. 5F to 5H illustrate example signal conditioning circuits that can be included in a communication system that operates with beamforming, such as the communication systems of FIG. 5A or 5C. Although various examples of signal conditioning circuits are depicted, other implementations of signal conditioning circuits can be used in combination with a crossbar switch.

FIG. 5F is a schematic diagram of a signal conditioning circuit 310 according to one embodiment. The signal conditioning circuit 310 includes a transmit port TX for receiving an RF transmit signal, an antenna port ANT for connecting to an antenna of antenna array, a controllable gain amplifier 301, a controllable fine phase shifter 302, and a power amplifier 303. The signal conditioning circuit 310 is suitable for use in communication system for beamforming a transmit beam.

In the illustrated embodiment, a gain of the controllable gain amplifier 301 is chosen to control a gain for the RF channel associated with the antenna that the signal conditioning circuit 310 is connected to. Additionally, a phase of the controllable fine phase shifter 302 operates in combination with a crossbar switch (not shown in FIG. 5F) to control a phase for the RF channel associated with the antenna. Such a crossbar switch can be coupled to the transmit port TX or between the antenna port ANT and the antenna.

FIG. 5G is a schematic diagram of a signal conditioning circuit 320 according to another embodiment. The signal conditioning circuit 320 includes a receive port RX for outputting an RF receive signal, an antenna port ANT for connecting to an antenna of antenna array, a controllable gain amplifier 305, a controllable fine phase shifter 306, and a low noise amplifier 307. The signal conditioning circuit 320 is suitable for use in communication system for beamforming a receive beam.

In the illustrated embodiment, a gain of the controllable gain amplifier 305 is chosen to control a gain for the RF channel associated with the antenna that the signal conditioning circuit 320 is connected to. Additionally, a phase of the controllable fine phase shifter 306 operates in combination with a crossbar switch (not shown in FIG. 5G) to control a phase for the RF channel associated with the antenna. Such a crossbar switch can be coupled to the receive port RX or between the antenna port ANT and the antenna.

FIG. 5H is a schematic diagram of a signal conditioning circuit 330 according to another embodiment. The signal conditioning circuit 330 includes a receive port RX for outputting an RF receive signal, a transmit port TX for receiving an RF transmit signal, an antenna port ANT for connecting to an antenna of antenna array, a first controllable gain amplifier 301, a first controllable fine phase shifter 302, a power amplifier 303, a second controllable gain amplifier 305, a second controllable fine phase shifter 306, a low noise amplifier 307, and a transmit/receive switch 321. The signal conditioning circuit 330 is suitable for use in communication system for selectively beamforming a transmit beam or a receive beam on a common antenna array.

Figure 6A:
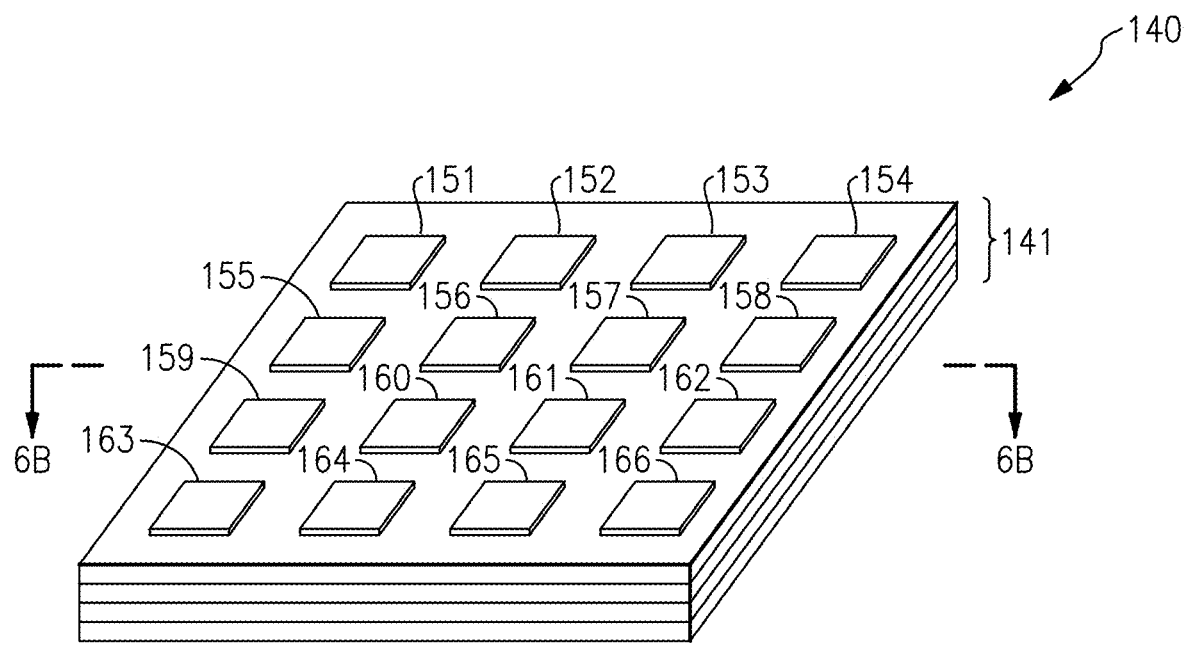
FIG. 6A is a perspective view of one embodiment of a module that operates with beamforming.
Figure 6B:
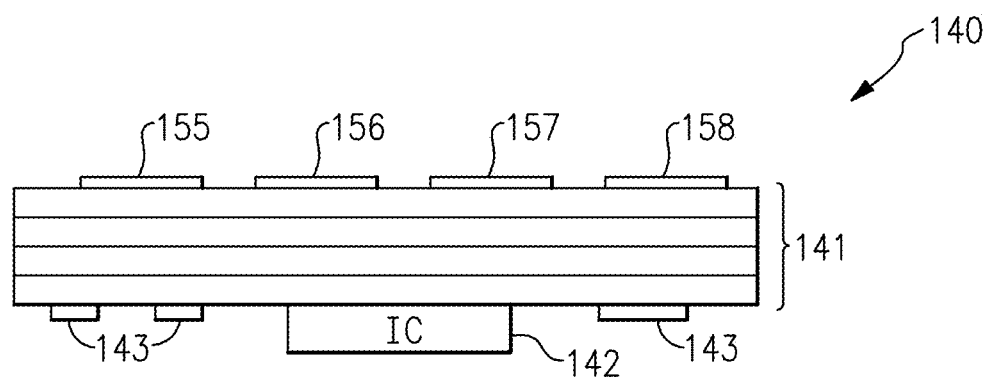
FIG. 6B is a cross-section of the module of FIG. 6A taken along the lines 6B-6B.

FIG. 6A is a perspective view of one embodiment of a module 140 that operates with beamforming. FIG. 6B is a cross-section of the module 140 of FIG. 6A taken along the lines 6B-6B.

The module 140 includes a laminated substrate or laminate 141, a semiconductor die or IC 142, surface mount components 143, and an antenna array including patch antenna elements 151-166.

Although one embodiment of a module is shown in FIGS. 6A and 6B, the teachings herein are applicable to modules implemented in a wide variety of ways. For example, a module can include a different arrangement of and/or number of antenna elements, dies, and/or surface mount components. Additionally, the module 140 can include additional structures and components including, but not limited to, encapsulation structures, shielding structures, and/or wirebonds.

In the illustrated embodiment, the antenna elements 151-166 are formed on a first surface of the laminate 141, and can be used to transmit and/or receive signals. Although the illustrated antenna elements 151-166 are rectangular, the antenna elements 151-166 can be shaped in other ways. Additionally, although a 4×4 array of antenna elements is shown, more or fewer antenna elements can be provided. Moreover, antenna elements can be arrayed in other patterns or configurations. Furthermore, in another embodiment, multiple antenna arrays are provided, such as separate antenna arrays for transmit and receive and/or multiple antenna arrays for MIMO and/or switched diversity.

In certain implementations, the antenna elements 151-166 are implemented as patch antennas. A patch antenna can include a planar antenna element positioned over a ground plane. A patch antenna can have a relatively thin profile and exhibit robust mechanical strength. In certain configurations, the antenna elements 151-166 are implemented as patch antennas with planar antenna elements formed on the first surface of the laminate 141 and the ground plane formed using an internal conductive layer of the laminate 141.

Although an example with patch antennas is shown, a modulate can include any suitable antenna elements, including, but not limited to, patch antennas, dipole antennas, ceramic resonators, stamped metal antennas, and/or laser direct structuring antennas.

In the illustrated embodiment, the IC 142 and the surface mount components 143 are on a second surface of the laminate 141 opposite the first surface.

In certain implementations, the IC 142 includes signal conditioning circuits associated with the antenna elements 151-166. In one embodiment, the IC 142 includes a serial interface, such as a mobile industry processor interface radio frequency front-end (MIPI RFFE) bus and/or inter-integrated circuit (I2C) bus that receives data for controlling the signal conditioning circuits, such as the amount of phase shifting provided by phase shifters. In another embodiment, the IC 142 includes signal conditioning circuits associated with the antenna elements 151-166 and an integrated transceiver.

The laminate 141 can be implemented in a variety of ways, and can include for example, conductive layers, dielectric layers, solder masks, and/or other structures. The number of layers, layer thicknesses, and materials used to form the layers can be selected based on a wide variety of factors, which can vary with application. The laminate 141 can include vias for providing electrical connections to signal feeds and/or ground feeds of the antenna elements 151-166. For example, in certain implementations, vias can aid in providing electrical connections between signaling conditioning circuits of the IC 142 and corresponding antenna elements.

The module 140 can be included in a communication system, such as a mobile phone or base station. In one example, the module 140 is attached to a phone board of a mobile phone.

Figure 7:
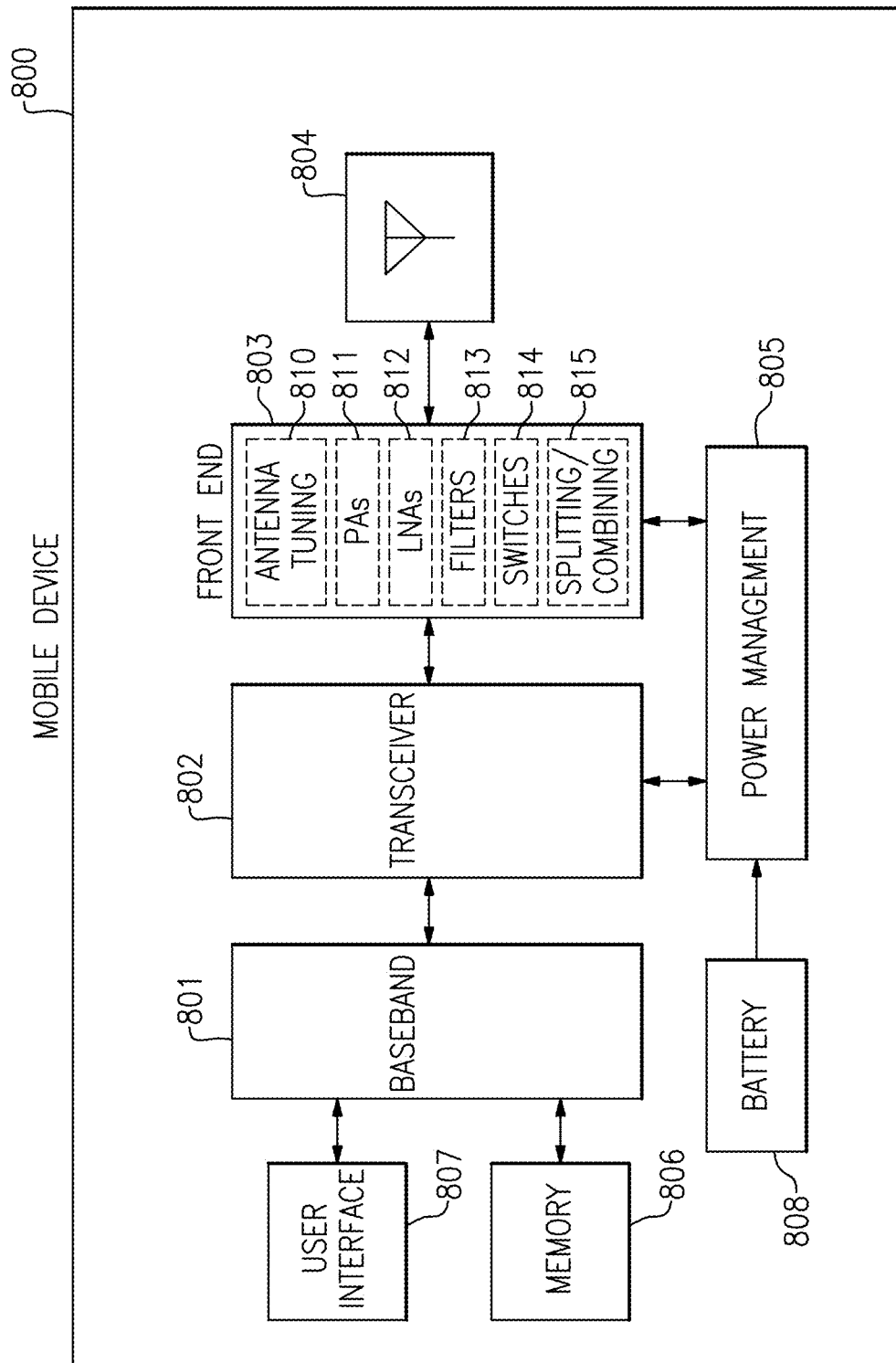
FIG. 7 is a schematic diagram of one embodiment of a mobile device.

FIG. 7 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 7 as the transceiver 802. In one example, separate components (for instance, separate circuits or dies) can be provided for handling certain types of RF signals.

The front end system 803 aids in conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 7, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 7, the power management system 805 receives a battery voltage from the battery 808. The battery 808 can be any suitable battery for use in the mobile device 800, including, for example, a lithium-ion battery.

Figure 8:
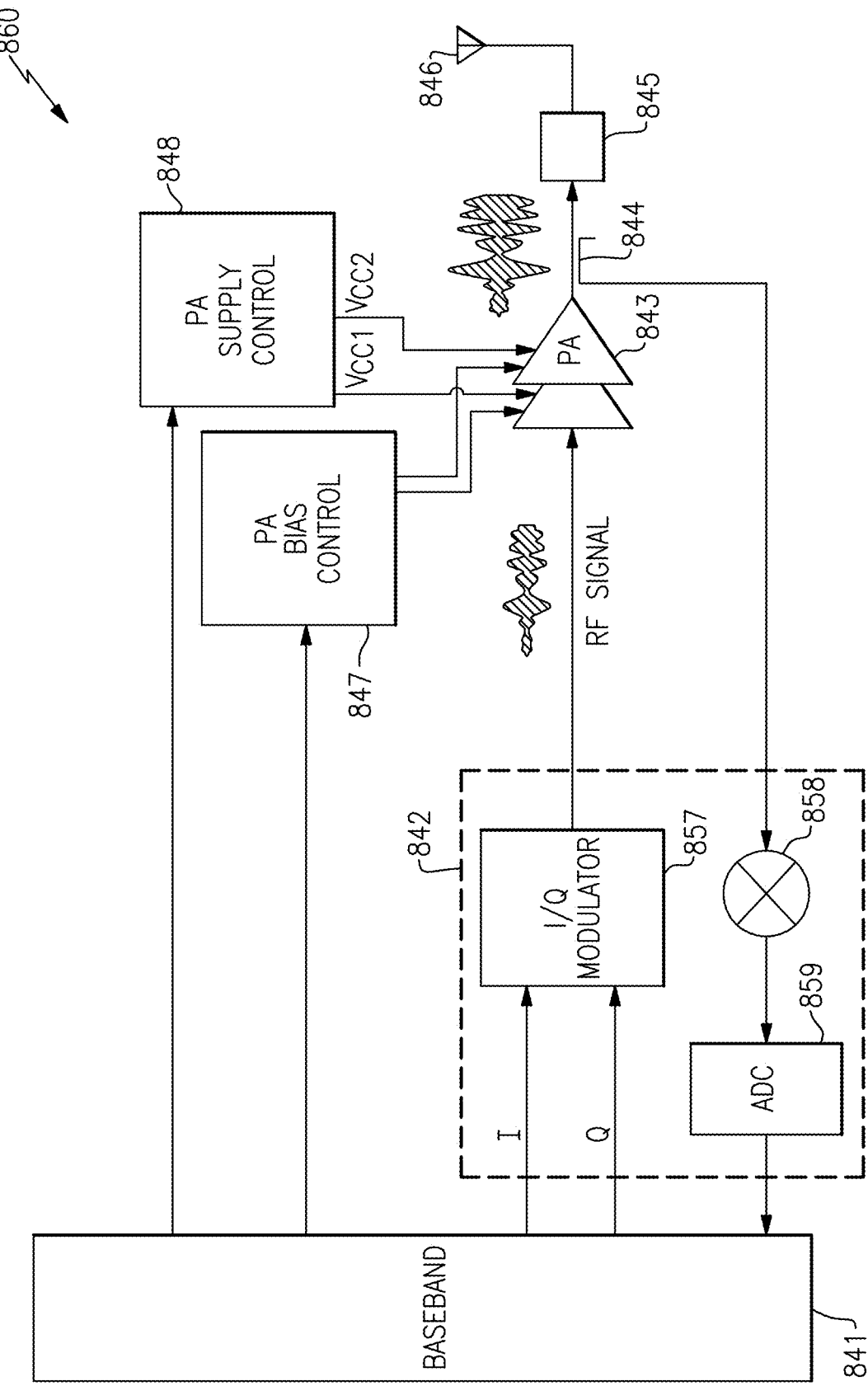
FIG. 8 is a schematic diagram of a power amplifier system according to another embodiment.

FIG. 8 is a schematic diagram of a power amplifier system 860 according to another embodiment. The illustrated power amplifier system 860 includes a baseband processor 841, a transmitter/observation receiver 842, a power amplifier (PA) 843, a directional coupler 844, front-end circuitry 845, an antenna 846, a PA bias control circuit 847, and a PA supply control circuit 848. The illustrated transmitter/observation receiver 842 includes an I/Q modulator 857, a mixer 858, and an analog-to-digital converter (ADC) 859. In certain implementations, the transmitter/observation receiver 842 is incorporated into a transceiver.

The baseband processor 841 can be used to generate an in-phase (I) signal and a quadrature-phase (Q) signal, which can be used to represent a sinusoidal wave or signal of a desired amplitude, frequency, and phase. For example, the I signal can be used to represent an in-phase component of the sinusoidal wave and the Q signal can be used to represent a quadrature-phase component of the sinusoidal wave, which can be an equivalent representation of the sinusoidal wave. In certain implementations, the I and Q signals can be provided to the I/Q modulator 857 in a digital format. The baseband processor 841 can be any suitable processor configured to process a baseband signal. For instance, the baseband processor 841 can include a digital signal processor, a microprocessor, a programmable core, or any combination thereof. Moreover, in some implementations, two or more baseband processors 841 can be included in the power amplifier system 860.

The I/Q modulator 857 can be configured to receive the I and Q signals from the baseband processor 841 and to process the I and Q signals to generate an RF signal. For example, the I/Q modulator 857 can include digital-to-analog converters (DACs) configured to convert the I and Q signals into an analog format, mixers for upconverting the I and Q signals to RF, and a signal combiner for combining the upconverted I and Q signals into an RF signal suitable for amplification by the power amplifier 843. In certain implementations, the I/Q modulator 857 can include one or more filters configured to filter frequency content of signals processed therein.

The power amplifier 843 can receive the RF signal from the I/Q modulator 857, and when enabled can provide an amplified RF signal to the antenna 846 via the front-end circuitry 845.

The front-end circuitry 845 can be implemented in a wide variety of ways. In one example, the front-end circuitry 845 includes one or more switches, filters, duplexers, multiplexers, and/or other components. In another example, the front-end circuitry 845 is omitted in favor of the power amplifier 843 providing the amplified RF signal directly to the antenna 846.

The directional coupler 844 senses an output signal of the power amplifier 823. Additionally, the sensed output signal from the directional coupler 844 is provided to the mixer 858, which multiplies the sensed output signal by a reference signal of a controlled frequency. The mixer 858 operates to generate a downshifted signal by downshifting the sensed output signal's frequency content. The downshifted signal can be provided to the ADC 859, which can convert the downshifted signal to a digital format suitable for processing by the baseband processor 841. Including a feedback path from the output of the power amplifier 843 to the baseband processor 841 can provide a number of advantages. For example, implementing the baseband processor 841 in this manner can aid in providing power control, compensating for transmitter impairments, and/or in performing digital pre-distortion (DPD). Although one example of a sensing path for a power amplifier is shown, other implementations are possible.

The PA supply control circuit 848 receives a power control signal from the baseband processor 841, and controls supply voltages of the power amplifier 843. In the illustrated configuration, the PA supply control circuit 848 generates a first supply voltage $V_{CC1}$ for powering an input stage of the power amplifier 843 and a second supply voltage $V_{CC2}$ for powering an output stage of the power amplifier 843. The PA supply control circuit 848 can control the voltage level of the first supply voltage $V_{CC1}$ and/or the second supply voltage $V_{CC2}$ to enhance the power amplifier system's PAE.

The PA supply control circuit 848 can employ various power management techniques to change the voltage level of one or more of the supply voltages over time to improve the power amplifier's power added efficiency (PAE), thereby reducing power dissipation.

One technique for improving efficiency of a power amplifier is average power tracking (APT), in which a DC-to-DC converter is used to generate a supply voltage for a power amplifier based on the power amplifier's average output power. Another technique for improving efficiency of a power amplifier is envelope tracking (ET), in which a supply voltage of the power amplifier is controlled in relation to the envelope of the RF signal. Thus, when a voltage level of the envelope of the RF signal increases the voltage level of the power amplifier's supply voltage can be increased. Likewise, when the voltage level of the envelope of the RF signal decreases the voltage level of the power amplifier's supply voltage can be decreased to reduce power consumption.

In certain configurations, the PA supply control circuit 848 is a multi-mode supply control circuit that can operate in multiple supply control modes including an APT mode and an ET mode. For example, the power control signal from the baseband processor 841 can instruct the PA supply control circuit 848 to operate in a particular supply control mode.

As shown in FIG. 8, the PA bias control circuit 847 receives a bias control signal from the baseband processor 841, and generates bias control signals for the power amplifier 843. In the illustrated configuration, the bias control circuit 847 generates bias control signals for both an input stage of the power amplifier 843 and an output stage of the power amplifier 843. However, other implementations are possible.

Applications

Some of the embodiments described above have provided examples in connection with wireless devices or mobile phones. However, the principles and advantages of the embodiments can be used for any other suitable systems or apparatus.

For example, the embodiments herein can be implemented in various electronic devices. Examples of the electronic devices can include, but are not limited to, consumer electronic products, parts of the consumer electronic products, electronic test equipment, etc. Examples of the electronic devices can also include, but are not limited to, memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, etc. Further, the electronic devices can include unfinished products.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
    an antenna array including a plurality of antennas configured to handle a plurality of radio frequency signals; and
    a front end system coupled to the antenna array, the front end system including a plurality of signal conditioning circuits each including a phase shifter that provides fine phase shifting to a respective one of the plurality of radio frequency signals based on a fine control signal, the front end system further including a crossbar switch configured to provide coarse phase shifting to the plurality of radio frequency signals based on a coarse control signal, the plurality of signal conditioning circuits coupled between the crossbar switch and the plurality of antennas and each directly connected to a corresponding one of the plurality of antennas, a number of the plurality of antennas and a number of the plurality of signal conditioning circuits being equal.

2. The mobile device of claim 1 wherein a number of inputs to the crossbar switch is greater than a number of outputs of the crossbar switch.

3. The mobile device of claim 1 wherein a number of inputs to the crossbar switch is less than a number of outputs of the crossbar switch.

4. The mobile device of claim 1 wherein the crossbar switch is implemented with a buffer function and a switch function.

5. The mobile device of claim 1 wherein the plurality of radio frequency signals are received on the antenna array.

6. The mobile device of claim 1 wherein the plurality of radio frequency signals are transmitted on the antenna array.

7. The mobile device of claim 1 further comprising a transceiver coupled to the front end system and configured to process the plurality of radio frequency signals.

8. The mobile device of claim 7 wherein the transceiver generates the coarse control signal and the fine control signal.

9. The mobile device of claim 1 wherein the phase shifter of each of the plurality of signal conditioning circuits is directly connected to a corresponding one of the plurality of antennas.

10. A front end system for a mobile device, the front end system comprising:
    a plurality of antenna terminals for coupling to an antenna array, the plurality of antenna terminals configured to handle a plurality of radio frequency signals;

a plurality of signal conditioning circuits each including a phase shifter configured to provide fine phase shifting to a respective one of the plurality of radio frequency signals based on a fine control signal; and a crossbar switch configured to provide coarse phase shifting to the plurality of radio frequency signals based on a coarse control signal, the plurality of signal conditioning circuits coupled between the crossbar switch and the plurality of antenna terminals and each directly connected to a corresponding one of the plurality of antenna terminals, a number of the plurality of antenna terminals and a number of the plurality of signal conditioning circuits being equal.

11. The front end system of claim 10 wherein a number of inputs to the crossbar switch and a number of outputs to the crossbar switch are equal.

12. The front end system of claim 10 wherein a number of inputs to the crossbar switch is greater than a number of outputs to the crossbar switch.

13. The front end system of claim 10 wherein a number of inputs to the crossbar switch is less than a number of outputs to the crossbar switch.

14. The front end system of claim 10 wherein the crossbar switch is implemented with a buffer function and a switch function.

15. A method of phase shifting in a mobile device, the method comprising:

finely phase shifting a plurality of radio frequency signals based on a fine control signal using a plurality of signal conditioning circuits, each of the plurality of signal conditioning circuits including a phase shifter providing fine phase shifting to a respective one of the plurality of radio frequency signals;

coarsely phase shifting the plurality of radio frequency signals using a crossbar switch based on a coarse control signal; and wirelessly communicating the plurality of radio frequency signals using a plurality of antennas of an antenna array, the plurality of signal conditioning circuits coupled between the crossbar switch and the plurality of antennas and each directly connected to a corresponding one of the plurality of antennas, a number of the plurality of antennas and a number of the plurality of signal conditioning circuits being equal.

16. The method of claim 15 wherein coarsely phase shifting the plurality of radio frequency signals using the crossbar switch includes buffering the plurality of radio frequency signals, and switching the plurality of radio frequency signals.

17. The method of claim 15 wherein wirelessly communicating the plurality of radio frequency signals includes receiving the plurality of radio frequency signals on the antenna array.

18. The method of claim 15 wherein wirelessly communicating the plurality of radio frequency signals includes transmitting the plurality of radio frequency signals on the antenna array.

19. The method of claim 15 wherein a number of inputs to the crossbar switch is greater than a number of outputs of the crossbar switch.

20. The method of claim 15 wherein a number of inputs to the crossbar switch is less than a number of outputs of the crossbar switch.

* * * * *